United States Patent [19]
Umezawa et al.

[11] Patent Number: 5,444,680
[45] Date of Patent: Aug. 22, 1995

[54] DIGITAL SIGNAL PROCESSING APPARATUS WITH A READ ERROR CORRECTION FUNCTION

[75] Inventors: Masaru Umezawa; Hiroki Kuribayashi, both of Tsurugashima, Japan

[73] Assignee: Pioneer Electronic Corporation, Tokyo, Japan

[21] Appl. No.: 196,861

[22] Filed: Feb. 15, 1994

[30] Foreign Application Priority Data

Feb. 16, 1993 [JP] Japan .................................. 5-026864

[51] Int. Cl.$^6$ .......................... G11B 17/22; H04N 5/76
[52] U.S. Cl. .......................................... 369/32; 369/59
[58] Field of Search .................... 369/32, 59, 47, 48, 369/54; 360/40, 48, 51, 65, 32, 61

[56] References Cited

U.S. PATENT DOCUMENTS

| | | | |
|---|---|---|---|
| 4,466,089 | 8/1984 | Wachi | 369/59 |
| 4,685,098 | 8/1987 | Yoshida | 369/59 |
| 4,835,759 | 5/1989 | Saito et al. | 369/59 |
| 4,866,692 | 9/1989 | Saito et al. | 369/59 |
| 4,914,623 | 4/1990 | Hudson et al. | 369/59 |
| 5,293,369 | 3/1994 | Melas et al. | 369/59 |
| 5,295,128 | 3/1994 | Hutchins et al. | 369/59 |

FOREIGN PATENT DOCUMENTS

62-165769 7/1987 Japan .
2123561 5/1990 Japan .

*Primary Examiner*—Scott J. Sugarman
*Assistant Examiner*—Tan Dinh
*Attorney, Agent, or Firm*—Cushman, Darby & Cushman

[57] ABSTRACT

A digital signal reproducing apparatus which is capable of accurately reproducing a digital signal from a recording medium on which signals are recorded at a high density. A read signal outputted from a pickup is converted into a binary signal which is synchronized to produce a synchronized binary signal. From this synchronized binary signal, a synchronized short pulse binary signal portion is detected which has an inversion interval shorter than a predetermined period and thus may violate a run length limit. The apparatus determines whether the center position on the time base of the short pulse binary signal portion before synchronization is closer to the sampling timing existing immediately before the short pulse binary signal portion or closer to the sampling timing existing immediately after the short pulse binary signal portion. The logic of the synchronized binary signal at the sampling timing determined as being closer is inverted to correct erroneously read data.

8 Claims, 8 Drawing Sheets

| ADDRESS | ADDRESS INPUT | | | | DATA OUTPUT | | | |
|---|---|---|---|---|---|---|---|---|
| | A3 | A2 | A1 | A0 | D3 | D2 | D1 | D0 |
| 2 | 0 | 0 | 1 | 0 | 0 | 1 | 0 | 0 |
| B | 1 | 0 | 1 | 1 | 0 | 0 | 1 | 0 |

DIGITAL SIGNAL PROCESSING APPARATUS WITH A READ ERROR CORRECTION FUNCTION

BACKGROUND OF THE INVENTION

1. Field of the Invention

The present invention relates to a reading/reproducing apparatus for reading and reproducing digital signals recorded on a recording medium such as an optical disk, and more particularly to a digital signal reproducing technique for use in such an apparatus.

2. Description of Background Information

Conventional digital signal reproducing apparatuses may have a problem in that, during reproducing digital signals from a recording medium on which signals are recorded at a high density, reading errors often occur when reading recorded data which has a short changing interval.

OBJECT AND SUMMARY OF THE INVENTION

The present invention has been made to solve the problem mentioned above, and it is an object of the present invention to provide a digital signal reproducing apparatus which is capable of accurately reproducing digital signals from a recording medium on which digital signals are recorded at a high density.

A digital signal reproducing apparatus according to a first aspect of the invention is provided for reproducing a digital signal from a read signal from a recording medium on which digital signals having a limited run length are recorded, and has digitizing means for converting the read signal into a binary signal based on a predetermined threshold value; synchronizing means for synchronizing the binary signal at a predetermined timing to produce a synchronized binary signal; detector means for detecting a synchronized short pulse binary signal portion having a inverting interval shorter than a predetermined time from the synchronized binary signal; determining means for comparing a time difference from the sampling timing existing immediately before the synchronized short pulse binary signal portion before the synchronization to a front edge timing of the short pulse binary signal portion with a time difference from a rear edge timing of the short pulse binary signal portion to the sampling timing existing immediately after the short pulse binary signal portion in order to determine one of the sampling timings existing immediately before and immediately after the short pulse binary signal portion which is closer to the short pulse binary signal portion than the other; and correcting means for inverting the value of the synchronized binary signal which has been synchronized at the sampling timing conforming to the determination result of the determining means to correct erroneously read data.

A digital signal reproducing apparatus according to a second aspect of the invention is provided for reproducing a digital signal from a read signal from a recording medium on which digital signals having a limited run length are recorded, and has digitizing means for converting the read signal into a binary signal based on a predetermined threshold value; synchronizing means for synchronizing the binary signal at a predetermined timing to produce a synchronized binary signal; detector means for detecting a synchronized short pulse binary signal portion having a inverting interval shorter than a predetermined time from the synchronized binary signal; comparator means for comparing signal levels of the read signal at the predetermined sampling timings existing immediately before and immediately after the synchronized short pulse binary signal portion before synchronization; and correcting means for selecting one of the sampling timings existing immediately before and immediately after the short pulse binary signal portion in accordance with the comparison result of the comparator means and inverting the value of the synchronized binary signal at the selected sampling timing to correct erroneously read data.

A digital signal reproducing apparatus according to a third aspect of the invention is provided for reproducing a digital signal from a read signal from a recording medium on which the digital signal is recorded, and has digitizing means for converting the read signal into a binary signal based on a predetermined threshold value; a memory for receiving the binary signal as an address input and outputting a correcting data corresponding to the address; and correcting means for correcting the binary signal in accordance with the correcting data.

The digital signal reproducing apparatus according to the first aspect of the invention converts a read signal outputted from the pickup into a binary signal and synchronizes the binary signal to produce a synchronized binary signal. A synchronized short pulse binary signal portion, which has a shorter inverting interval than a predetermined time and thus violates the run length limit, is detected from the synchronized binary signal. Then, determination is made as to which of sampling timings existing before and after the short pulse binary signal portion, the short pulse binary signal portion before synchronization is closer to. The logic level of the synchronized binary signal synchronized at the closer sampling timing is inverted to correct erroneously read data.

The digital signal reproducing apparatus according to the second aspect of the present invention converts a read signal outputted from the pickup into a binary signal and synchronizes the binary signal to produce a synchronized binary signal. A synchronized short pulse binary signal portion, which has a shorter inverting interval than a predetermined time and thus violates the run length limit, is detected from the synchronized binary signal. The levels of the read signal at sampling timings existing immediately before and immediately after this synchronized short pulse binary signal portion before synchronization are compared to select one of the sampling timings existing immediately before or immediately after this short pulse binary signal portion in accordance with the comparison result. The logic level of the synchronized binary signal at the selected sampling timing is inverted to correct erroneously read data.

The digital signal reproducing apparatus according to the third aspect of the invention converts a read signal outputted from the pickup into a binary signal. Erroneously read data in the binary signal is corrected in accordance with a correcting data output from a memory which utilizes the binary signal as an address input and provides correcting data corresponding to the address.

DETAILED DESCRIPTION OF THE PREFERRED EMBODIMENTS

Before describing embodiments of the present invention in detail, an example of conventional digital signal reproducing apparatuses will be explained with reference to FIGS. 1, 2A and 2B.

Figure 1:
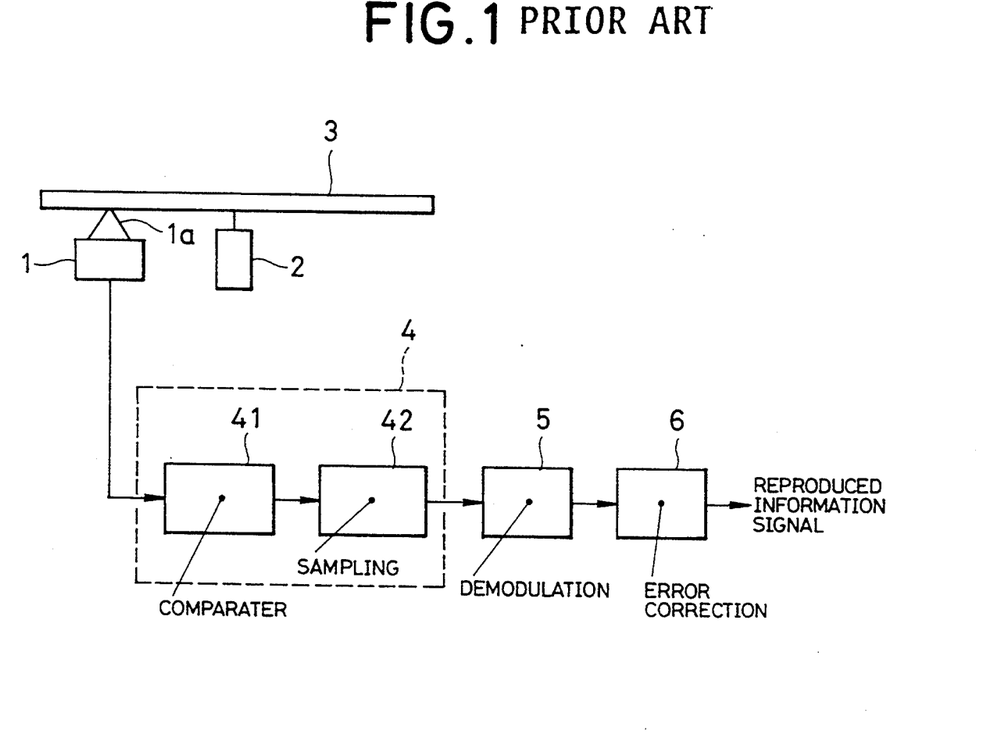
FIG. 1 is a block diagram showing the configuration of a disk player.

FIG. 1 shows the configuration of a digital signal reproducing apparatus as an apparatus for reading and reproducing recorded digital signals.

An optical pickup 1 emits a light beam 1a to an optical disk 3, which is rotated by a spindle motor 2, and reflected light therefrom is transduced into an electric signal which is supplied to a digital signal reproducing apparatus 4. Assume that, on the optical disk 3, a modulated code with its run length limited by Tmin=2 and Tmax=8 (this modulated code will hereinafter be referred to as the RLL code) is recorded in digital form. The digital signal reproducing apparatus 4 supplies a demodulator circuit 5 with signals corresponding to digital data "1" and "0" in accordance with the levels of a signal supplied thereto. The demodulator circuit 5 demodulates the RLL coded signal which is then supplied to an error correcting circuit 6. The error correcting circuit 6 corrects errors possibly included in the supplied signal and outputs an error free signal as a reproduced information signal.

Next, the digital signal reproducing apparatus 4 will be explained.

A comparator 41 compares the level of a read signal supplied from the optical pickup 1 with a predetermined slice level, and supplies a sampling circuit 42 with a signal corresponding to digital data "1" when the level of the read signal is equal to or more than the slice level, and with a signal corresponding to digital data "0" when it is less than the slice level. The sampling circuit 42 samples the signal from the comparator 41 at a predetermined timing and supplies the demodulator circuit 5 with the sampled signal as digital data "1" or "0".

Figure 2A:
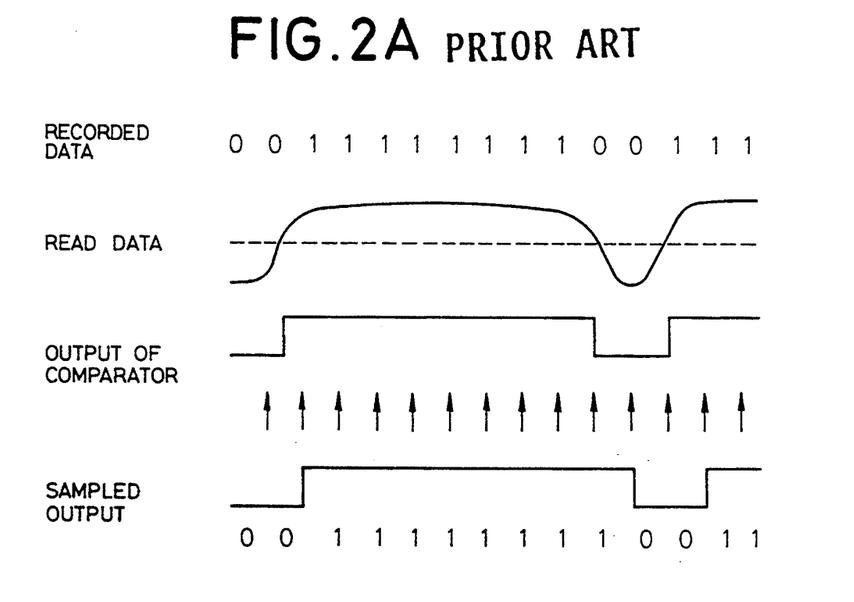
FIGS. 2A, 2B show waveform charts for explaining the operation of a conventional digital signal reproducing apparatus.

FIG. 2A shows in waveform chart form an example of the operation performed by the above-mentioned conventional digital signal reproducing apparatus.

The optical pickup 1 reads a sequence of data "001111111100111" recorded on the optical disk 3 and outputs a read signal as indicated by the solid line. The comparator 41 compares the level of the read signal with a predetermined slice level as indicated by the broken line and outputs a signal corresponding to "1" when the level of the read signal is equal to or more than the slice level and a signal corresponding to "0" when it is less than the slice level. The sampling circuit 42 outputs a sequence of sampled signals converted from the signal from the comparator 41 at timings indicated by the arrows. In this manner, the digital signal reproducing apparatus 4 reproduces the sequence of data "001111111100111" recorded on the optical disk 3.

Figure 2B:
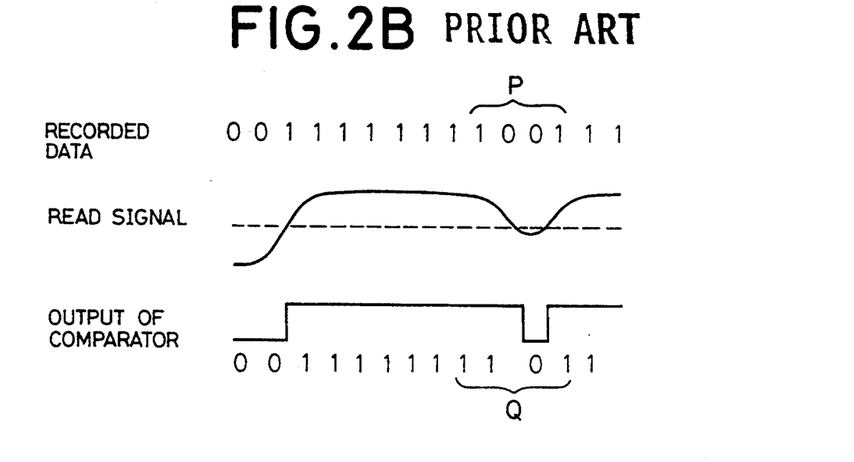

FIG. 2B shows the operation of the conventional digital signal reproducing apparatus for reading information from a optical disk 3 on which signals are recorded at a high density.

The signal level of a read signal corresponding to a recorded data portion "1001" having a short changing cycle as indicated by P in FIG. 2B, rises before it sufficiently lowers below the slice level as shown in the chart, due to the limit of resolution of the optical pickup 1, whereby the amplitude of the read signal is attenuated. Generally, a read signal with a short changing cycle, having the amplitude attenuated, becomes more susceptible to the influence of transmission path noise or the like, with the result that the comparator 41 may erroneously determine the read signal corresponding to the recorded data "1001" in the portion P as "1101" shown in a portion Q of the comparator output, and delivers the erroneously determined signal.

As explained above, in the conventional digital signal reproducing apparatus, when digital signals are reproduced from a recording medium on which signals are recorded at a high density, reading errors may possibly occur when recorded data with a short changing cycle is read from the recording medium.

Next, the present invention will be described in connection with the preferred embodiments.

It is assumed that a modulated code employed herein is an RLL code having the run length limited at Tmin=2 and Tmax=8.

Figure 3:
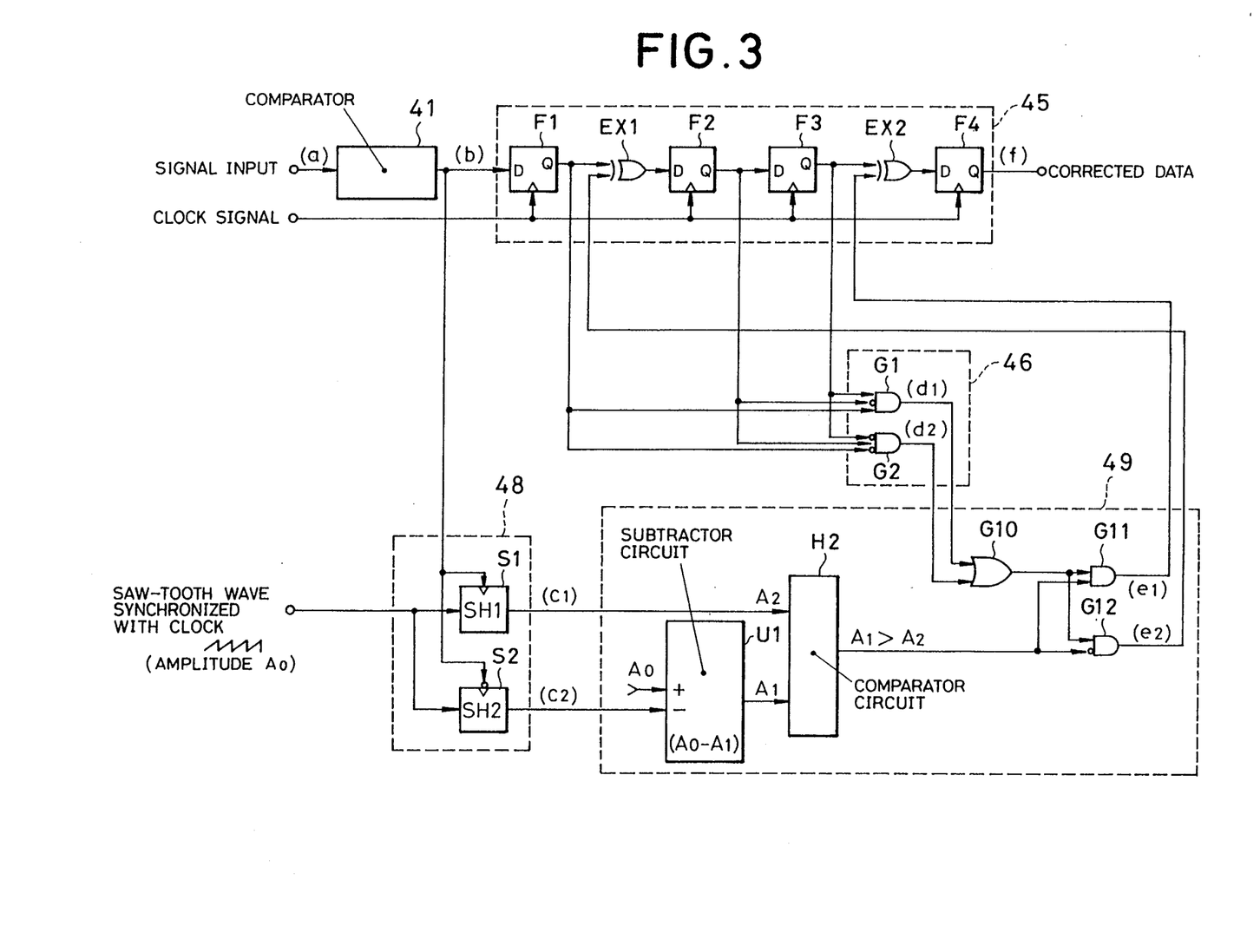
FIG. 3 is a block diagram showing a digital signal reproducing apparatus according to a first feature of the present invention.

FIG. 3 shows the configuration of a digital signal reproducing apparatus according to a first feature of the present invention.

In FIG. 3, a comparator 41 compares the level of a read signal supplied from an optical pickup 1 with a predetermined slice level, and supplies to a data correcting circuit 45 and an edge timing detector circuit 48 a binary signal corresponding to logic "1" when the level of the read signal is equal to or more than the predetermined slice level and with a binary signal corresponding to logic "0" when it is less than the predetermined slice level. The data correcting circuit 45 sequentially fetches the binary signal (b) from the comparator 41 at sampling timings conforming to pulses of a clock signal supplied thereto for synchronizing the binary signal (b) with the clock signal, and supplies a run length detector circuit 46 with the synchronized signal.

The run length detector circuit 46 detects, from the synchronized binary signal, a short pulse binary signal portion, which has an inverting interval shorter than a predetermined time and thus possibly violates the run length limit, and supplies such a detected signal portion to a successive timing comparator circuit 49. The edge timing detector circuit 48 detects a transition timing of a supplied binary signal from "0" to "1" or from "1" to "0" and supplies an edge detecting signal to the successive timing comparator circuit 49.

The successive timing comparator circuit 49 compares a time difference between a sampling timing before the generation of the short pulse binary signal portion detected by the run length detector circuit 46 and a front edge timing of the short pulse binary signal portion before synchronization with a time difference between a rear edge timing of the short pulse binary signal portion before synchronization and a sampling timing generated immediately after this short pulse binary signal portion. This comparison will determine one of the two temporally successive sampling timings to which the short pulse binary signal portion before synchronization is located closer. The successive timing comparator circuit 49 recognizes that the logic level of the binary signal synchronized at the closer sampling timing is erroneous and supplies the data correcting circuit 45 with an inverted data or a signal reverse to the binary signal determined as error. The data correcting circuit 45, when not supplied with the inverted signal, sequentially outputs the binary signal from the comparator 41 at a sampling timing of the clock signal supplied thereto as corrected data output, and when supplied with the inverted signal, inverts only the binary signal received at the time the inverted signal is supplied thereto and outputs the inverted binary signal as a corrected data output together with the other binary signals from the comparator 41 at the sampling timings of the clock signal pulses.

The operation performed internally to the data correcting circuit 45 will be next explained with reference to FIG. 3.

A binary signal from the comparator 41 is first supplied to a flip-flop F1 and then sequentially shifted through a series circuit composed of an exclusive OR gate EX1, a flip-flop F2, a flip-flop F3, an exclusive OR gate EX2, and a flip-flop F4 at timings of the supplied clock pulses, and outputted as a corrected data output. In this event, the exclusive OR gate EX1, when receiving the inverted signal from the timing comparator circuit 49, supplies the flip-flop F2 with a signal having the logic level reverse to that of the signal supplied from the flip-flop F1. Also, the exclusive OR gate EX2, when receiving the inverted signal from the successive timing comparator circuit 49, supplies the flip-flop F4 with a signal having the logic level reverse to that of the signal supplied from the flip-flop F3. The signal inversion performed by the exclusive OR gates EX1 and EX2 as described above results in correcting erroneous data.

The operation performed internally to the edge timing detector circuit 48 will be next explained with reference to FIGS. 3 and 4.

Sample and hold circuits SH1 and SH2 are supplied with a saw-tooth wave having an amplitude A which is synchronized with the clock signal. The sample and hold circuit SH1 holds a voltage level (K1, K3 in FIG. 4) of the saw-tooth wave at a rising edge of a binary signal supplied from the comparator 41 and supplies the same to the successive timing comparator circuit 49. The sample and hold circuit SH2 holds a voltage level (K2 in FIG. 4) of the saw-tooth wave at a falling edge of the binary signal supplied from the comparator 41 and supplies the same to the successive timing comparator circuit 49. The binary signal from the comparator 41 is thus converted to the voltage levels corresponding to the rising and falling edges thereof by the sample and hold circuits SH1 and SH2.

The operation performed internal to the run length detector circuit 46 will be next explained again with reference to FIGS. 3 and 4.

A logic gate G1 supplies a detecting signal at logic "1" (d1) to the successive timing comparator circuit 49 when a combination of outputs from the flip-flops F1, F2, F3 in the data correcting circuit 45 shows "101". A logic gate G2 a detecting signal at logic "1" (d2) to the successive timing comparator circuit 49 when a combination of outputs from the flip-flops F1, F2, F3 in the data correcting circuit 45 shows "010". With the configuration mentioned above, the run length detector circuit 46 detects a short pulse portion only including a single value "0" or "1" having a run length represented by Tmin=1, which never exists in the RLL coded signal limited by Tmin=2.

The operation performed internally to the successive timing comparator 49 will be next explained with reference to FIGS. 3 and 4.

A subtractor circuit U1 subtracts a voltage level supplied from the sample and hold circuit SH2 from a voltage level A0, and supplies the subtraction result (A0−K2 in FIG. 4) to an A1 terminal of a comparator circuit H2. The comparator circuit H2 is supplied at an A2 terminal with a voltage level (C1) from the sample and hold circuit SH1. The comparator circuit H2 compares the voltage level supplied to the A1 terminal with the voltage level supplied to the A2 terminal. In this event, the comparator circuit H2 supplies one terminal of each of logic gates G11 and G12 with a signal at logic "1" when A1>A2 and with a signal at logic "0" when A1<A2. A logic gate G10, when supplied with a detecting signal at logic "1" from the logic gate G1 or G2 of the run length detector circuit 46, supplies an output signal at logic "1" to the other terminal of each of the logic gates G11 and G12. The logic gate G11, when supplied with the signal at logic "1" from the comparator circuit H2 as well as the signal at logic "1" from the logic gate G10, supplies an inverted signal of the signal at logic "1" to the exclusive OR gate EX2. The logic gate G12, when supplied with the signal at logic "0" from the comparator circuit H2 as well as the signal at logic "1" from the logic gate G10, supplies an inverted signal of the signal at logic "1" to the exclusive OR gate EX1. With the configuration described above, the successive timing comparator circuit 49 compares a time difference from a sampling timing immediately before a short pulse binary signal portion having a single "0" or "1" represented by Tmin=1 is detected by the run length detector circuit 46 to the front edge of this short pulse binary signal portion (for example, when this short pulse binary signal portion includes a "0", a falling edge from "1" to "0") with a time difference between the rear edge of this short pulse binary signal portion (for example, when this short pulse binary signal portion includes a "0", a rising edge from "0" to "1") to a sampling timing immediately after this rear edge. Then, the successive timing comparator circuit 49 determines that the value of the binary signal sampled at the sampling timing with a smaller time difference is erroneous, and outputs an inverted signal to correct this erroneous value.

Next, the operation of the circuit configuration as described above will be explained in greater detail with reference to the operational waveform charts of FIG. 4.

Figure 4:
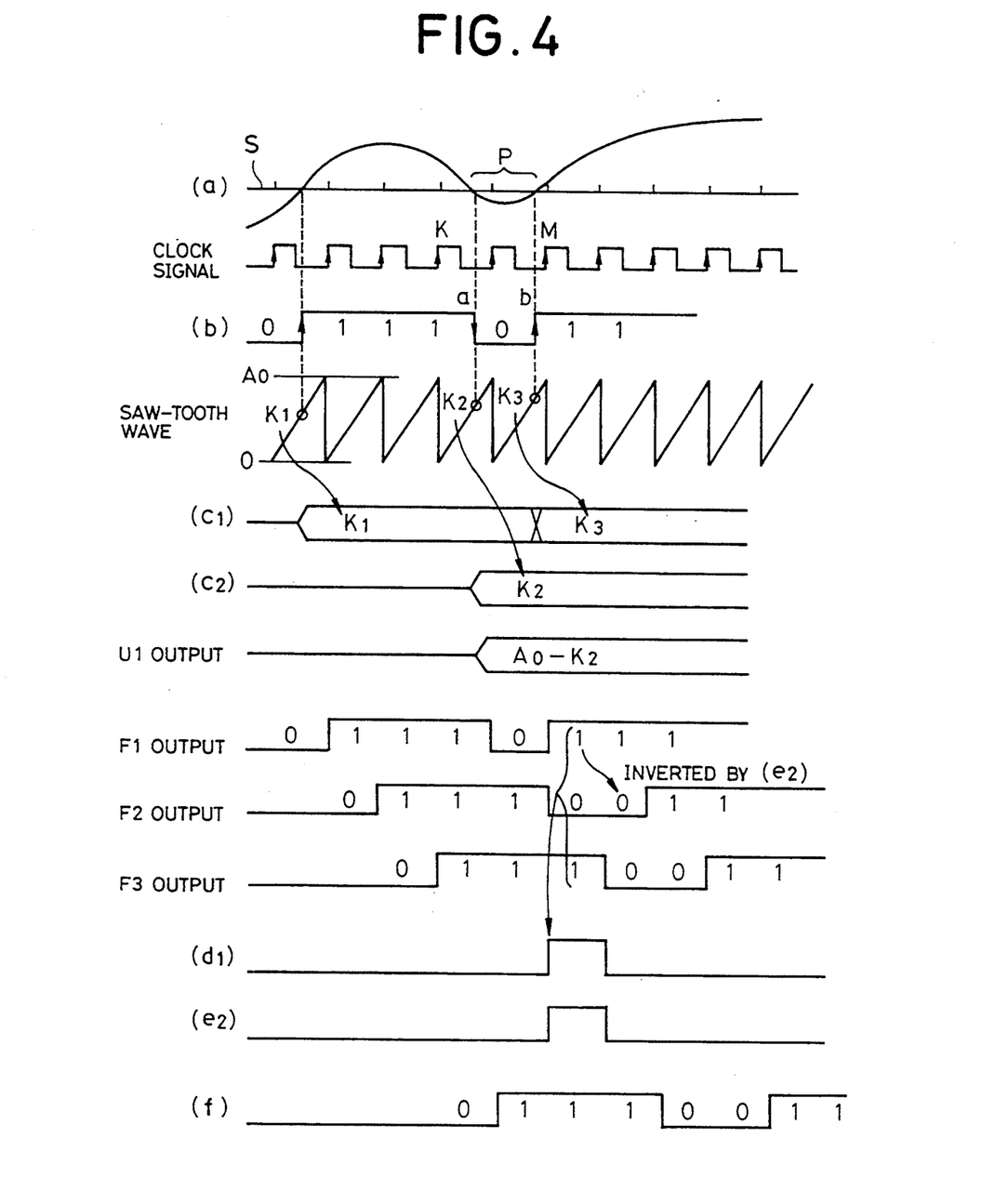
FIG. 4 shows waveform charts for explaining the operation of the digital signal reproducing apparatus according to the first feature of the present invention.

FIG. 4 shows, by way of example, the processes performed when a read signal (a) corresponding to a sequence of digital data "01110011" is supplied from the optical pickup 1. The comparator 41 outputs a binary signal as shown in (b) corresponding to "1" when the level of the read signal (a) supplied from the optical pickup 1 is equal to or more than a predetermined slice value S, and to "0" when it is less than the predetermined slice value S. If this is digitized at timings of the clock signal pulses, an erroneous digital data sequence "01110111" will be outputted as a binary signal. The sample and hold circuit SH1 of the edge timing detector circuit 48 holds voltage levels K1, K3 of the saw-tooth wave when the binary signal (b) transits from "0" to "1" and outputs the same as a voltage level signal (c1). The sample and hold circuit SH2 in turn holds a voltage level K2 of the saw-tooth wave when the binary signal (b) transits from "1" to "0" and outputs the same as a voltage level signal (c2). The run length detector circuit 46 detects a portion such as "101", which only includes short pulse binary value and possibly violates the run length limit, within the digital data sequence "01110111" which is sequentially shifted through the flip-flops F1–F3 in the data correcting circuit 45. The run length detector circuit 46, upon detecting such portion, outputs a detecting signal (d1).

The successive timing comparator circuit 49, when supplied with the detecting signal (d1), that is, upon detecting a short pulse binary value "0", compares the difference resulted by subtracting the value K2 of the voltage level signal (c2) from the voltage level A0 (A0−K2) with the value K3 of the voltage level signal (c1). This means that a time difference from a sampling timing K to a front edge a of the binary signal (b) is compared with a time difference from a rear edge b of the binary signal (b1) to a sampling timing M. In this event, as K3>(A0−K2) can be seen from the charts, it is confirmed that the time difference from the rear edge b of the binary signal (b) to the sampling timing M is smaller than the time difference from the sampling timing K to the front edge a of the same. Thus, the successive timing comparator circuit 49 determines that the binary signal (b) having "1" at the rear edge b is erroneous and supplies an inverted signal (e2) to the exclusive OR gate EX1 of the data correcting circuit 45.

With the supplied digital data sequence "01110111", the data correcting circuit 45 corrects or inverts the sixth logic level "1" thereof, which has been stored in the flip-flop F1 when the inverted signal (e2) is supplied, to produce "01110011" which is outputted therefrom as a corrected data output (f).

As described above, the digital signal reproducing apparatus shown in FIG. 3 according to the first feature of the present invention detects a short pulse binary signal portion (portion P in FIG. 4) having a shorter inverting interval than a predetermined time from a synchronized binary signal produced by digitizing and synchronizing a read signal, compares a time difference from a sampling timing (K in FIG. 4) immediately before this short pulse binary signal portion is detected to a front edge (a in FIG. 4) of the short pulse binary signal portion before synchronization with a time difference from the rear edge (b in FIG. 4) of the short pulse binary signal portion before synchronization to a sampling timing (M in FIG. 4) immediately after this rear edge in order to determine which of the sampling timings existing before and after the short pulse binary signal portion is closer to the short pulse binary signal portion, and inverts the logic level of the binary signal synchronized at the sampling timing determined as closer, to correct the erroneous data.

Figure 5:
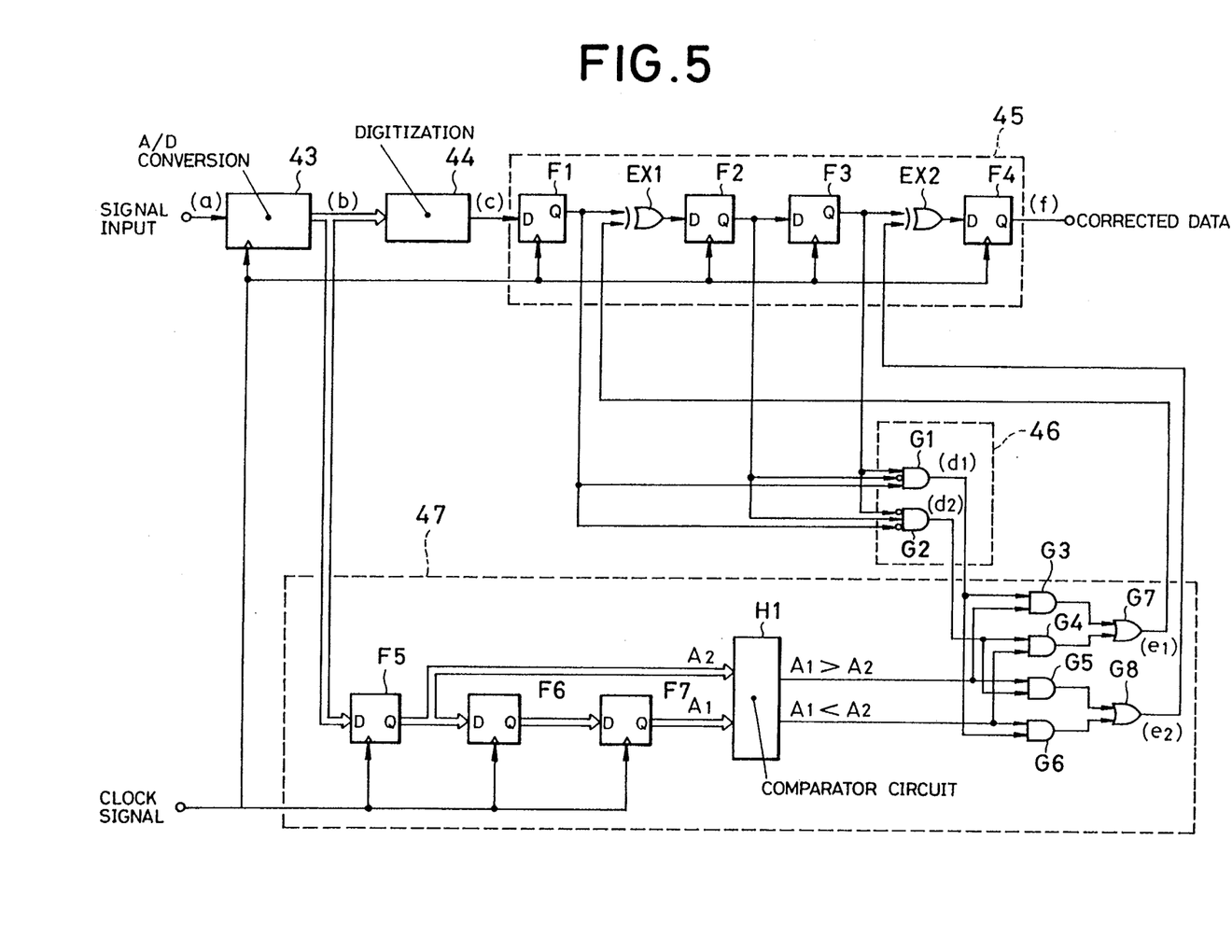
FIG. 5 is a block diagram showing a digital signal reproducing apparatus according to a second feature of the present invention.

FIG. 5 shows the configuration of a digital signal reproducing apparatus according to a second feature of the present invention.

In FIG. 5, an A/D convertor 43 converts a read signal supplied thereto from an optical pickup 1 into a digital value at a timing of a supplied clock and supplies the converted digital signal to a digitization determining circuit 44 and a successive level comparator circuit 47, respectively. The digitization determining circuit 44 supplies a data correcting circuit 45 with a binary bit corresponding to "1" when the value of a supplied digital signal is equal to or more than a predetermined slice value and with a binary bit corresponding to "0" when it is less than the predetermined slice value. The data correcting circuit 45 sequentially fetches binary signals from the digitization determining circuit 44 at timings of clock signal pulses supplied thereto for synchronizing the binary signals with the clock signal, and supplies the synchronized binary signal to a run length detecting circuit 46. The run length detector circuit 46 detects a short pulse binary signal portion which has an inverting interval shorter than a predetermined time and thus possibly violates the run length limit, and supplies a detecting signal indicative of such a short pulse binary signal portion to the successive level comparator circuit 47. The successive level comparator 47 then compares digital signals supplied from the A/D convertor 43 immediately before and immediately after the generation of the detecting signal, generates an inverted signal at a timing immediately before or immediately after the detecting signal in accordance with the comparison result, and supplies the inverted signal to the data correcting circuit 45. The data correcting circuit 45 outputs a binary signal as it is as a corrected data output when the inverted signal is not supplied thereto. Conversely, when the inverted signal is supplied to the data correcting circuit 45, the data correcting circuit 45 inverts only a binary signal received at the time the inverted signal is supplied, and outputs the inverted binary signal as a corrected data output.

Next, the operation performed internally to the successive level comparator circuit 47 will be explained with reference to FIGS. 5 and 6.

A digital signal (b) supplied from the A/D convertor 43 is first received by a flip-flop F5, sequentially shifted through a series circuit composed of a flip-flop F6 and a flip-flop F7 at timings of supplied clock signal pulses to be outputted from the flip-flop F7, and then supplied to an A1 terminal of a comparator circuit H1. In this event, the output of the flip-flop F5 is supplied to an A2 terminal of the comparator circuit H1 which compares the value of the digital signal supplied to the A1 terminal with the value of the digital signal supplied to the A2 terminal. If A1>A2, the comparator circuit H1 supplies a signal at logic "1" to one end of each of logic gates G3 and G5. Conversely, if A1<A2, the comparator circuit H1 supplies a signal at logic "1" to one end of each of logic gates G4 and G6. The other terminal of the respective logic gates G3 and G6 is supplied with the output from the logic gate G1 of the run length detector circuit 46, while the other terminal of the respective logic gates G4 and G5 is supplied with the output from the logic gate G2 of the run length detector circuit 46. When it is determined in the comparator circuit H1 that A1>A2 stands and when a data sequence "101" is detected by the logic gate G1, the logic gate G3 supplies a signal at logic "1" to a logic gate G7. When it is determined in the comparator circuit H1 that A1<A2 stands and when a data sequence of "010" is detected by the logic gate G2, the logic gate G4 supplies a signal at logic "1" to the logic gate G7. When it is determined in the comparator circuit H1 that A1>A2 stands and when a data sequence of "010" is detected by the logic gate G2, the logic gate G5 supplies a signal at logic "1" to the logic gate G8. When it is determined in the comparator circuit H1 that A1<A2 stands and when a data sequence of "101" is detected by the logic gate G1, the logic gate G6 supplies a signal at logic "1" to the logic gate G8. The logic gate G7, when supplied with the signal at logic "1" from the logic gate G3 or G4, supplies the exclusive OR gate EX1 with an inverted signal of the signal at logic "1". The logic gate G8, when supplied with the signal at logic "1" from the logic gate G5 or G6, supplies the exclusive OR gate EX2 with an inverted signal of the signal at logic "1".

With the configuration described above, if a data sequence such as "101", that is, a short pulse binary signal portion is detected from the run length detector circuit 46, the values of digital data corresponding to those at logic "1" before and after the data "0" of the detected sequence (i.e., a digital signal outputted from the A/D convertor 4) are compared by the comparator circuit H1. Here, if the value of the digital signal corresponding to "1" before the data "0" is smaller than the value of the digital data corresponding to "1" after the data "0", the circuit configuration composed of the logic gates G3–G8 acts to supply the exclusive OR gate EX1 with an inverted signal of logic "1". Conversely, when the former is larger than the latter, the exclusive OR gate EX2 is supplied with an inverted signal of logic "1". Also, in the case where a data sequence such as "010" i.e. a sequence of short pulse binary data is detected in the run length detector circuit 46, if the value of a digital data corresponding to "0" before the data "1" is larger than the value of a digital data corresponding to "0" after the data "1", the circuit configuration composed of the logic gates G3–G8 acts to supply the exclusive OR gate EX1 with an inverted signal of logic "1". Conversely, if the former is smaller than the latter, an inverted signal of logic "1" is supplied to the exclusive OR gate EX2.

The operation of the circuit configuration as described above will be next explained with reference to operational waveform charts of FIG. 6.

Figure 6:
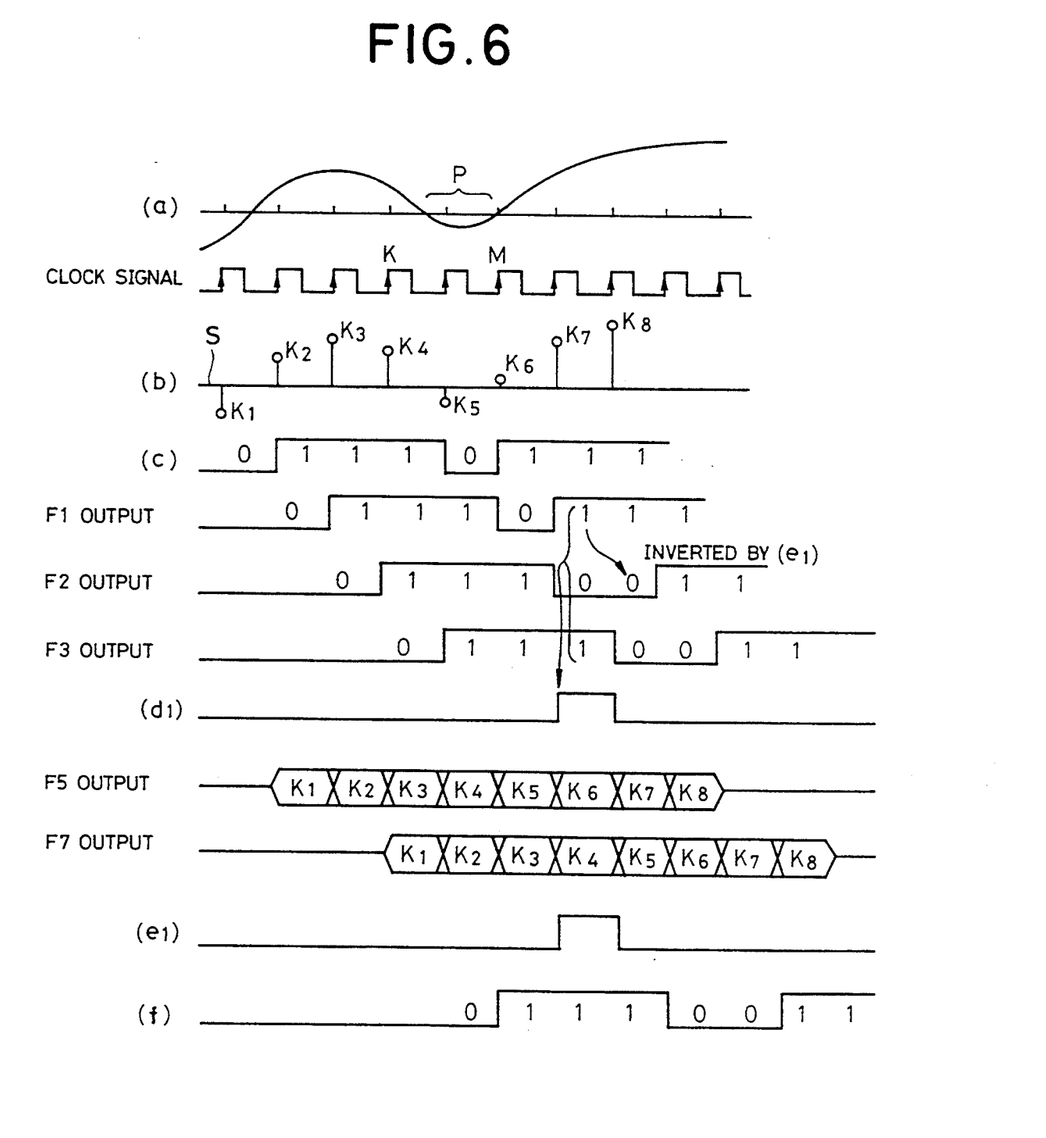
FIG. 6 shows waveform charts for explaining the operation of the digital signal reproducing apparatus according to the second feature of the present invention.

FIG. 6 shows an exemplary operation performed when a read signal (a) corresponding to a digital data sequence including "01110011" is supplied from the optical pickup 1. The A/D convertor 43 converts the supplied read signal (a) to digital values K1–K8, respectively, at timings of clock signal pulses supplied thereto, and outputs a digital signal as shown by (b). A digitization determining circuit 44 outputs a binary signal corresponding to "1" when each of the values K1–K8 in the supplied digital signal (b) is equal to or more than a predetermined slice value S and a binary signal corresponding to "0" when the value is less than the predetermined slice value S, as shown by (c). In this event, the digitization determining circuit 44 consequently outputs an erroneous digital data sequence "01110111". The run length detector circuit 46 detects a short pulse binary signal portion "010" within the digital data sequence "01110111", which is supplied thereto after it has been sequentially shifted through the flip-flop F1–F3 in the data correcting circuit 45, and outputs a detecting signal (d1). The successive level comparator circuit 47 compares output values of the flip-flops F5 and F7 at the time this detecting signal (d1) is generated. In this manner, the digital level K4 immediately before the generation of the detecting signal (d1) is compared with the digital level K6 immediately after the generation. In this particular example, since K4>K6 stands as illustrated, the successive level comparator circuit 47 recognizes that the data "1" determined by the digitization determining circuit 44 based on the digital level K6 is erroneous and should be "0", and outputs an inverted signal (e1) for indicating this error. The data correcting circuit 45 inverts only the sixth data "1", which has been stored in the flip-flop F1 when the inverted signal (e1) is supplied, within the digital data sequence (c) supplied thereto, to produce a digital data sequence "01110011" which is outputted therefrom as a corrected data output (f).

As described above, the digital signal reproducing apparatus according to the second feature of the present invention shown in FIG. 5 detects, from a binary signal sequence digitized from a read signal, a short pulse binary signal portion which has a shorter inverting interval than a predetermined time and thus violates the run length limit, compares the levels of the binary signal immediately before and immediately after the short pulse binary signal portion, before it is digitized, to determine the position of erroneous data based on the comparison result, and corrects the data determined as error. Also in the above configuration for comparing the value before digitization immediately before the generation of the short pulse binary signal portion (K4 in FIG. 6) with the value before digitization immediately after the generation of the short pulse binary signal portion (K6 in FIG. 6), it is possible, as illustrated, to determine which of the sampling timings existing before and after this signal portion (K or M in FIG. 6) the short pulse binary signal portion having an inverting interval shorter than a predetermined time (P in FIG. 6) is closer to, thus enabling erroneous data to be corrected similarly to the digital signal reproducing apparatus shown in FIG. 3.

Figure 7:
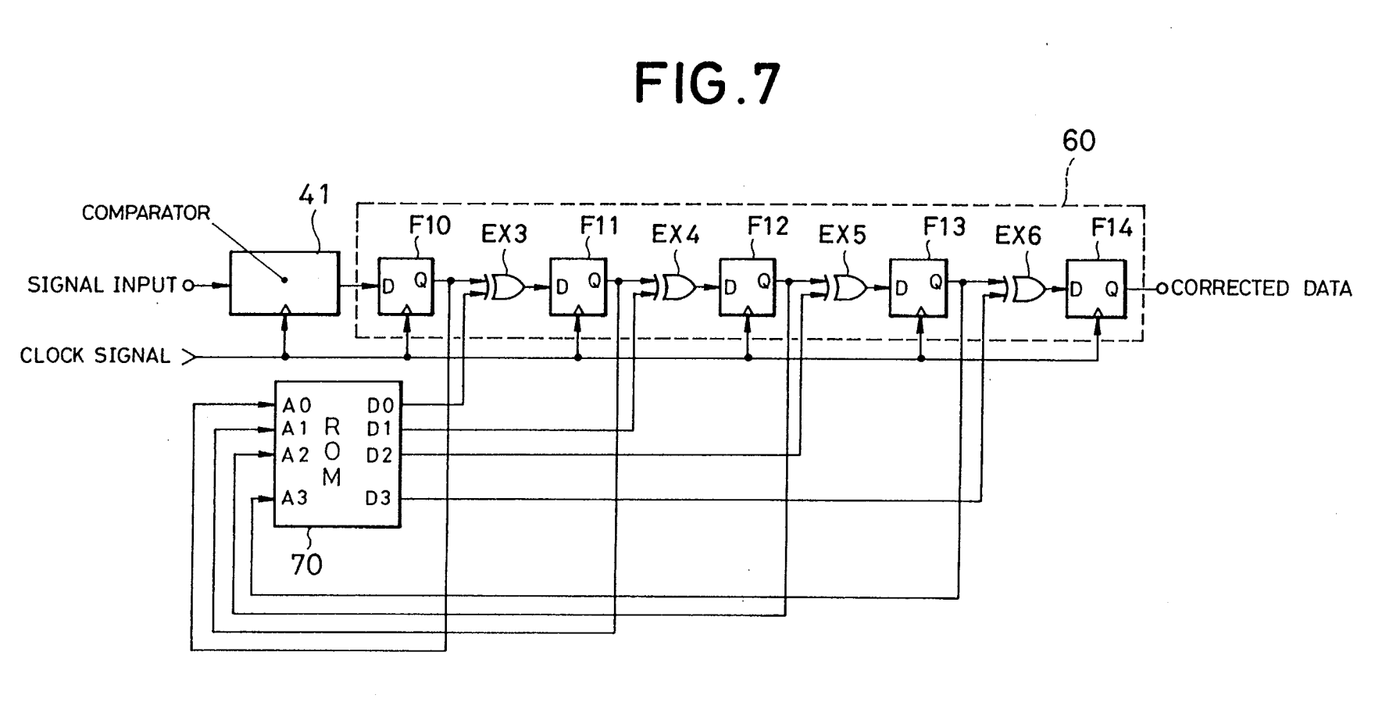
FIG. 7 is a block diagram showing the configuration of a digital signal reproducing apparatus according to a third feature of the present invention.

FIG. 7 shows the configuration of a digital signal reproducing apparatus according to a third feature of the present invention.

In FIG. 7, a comparator 41 compares the level of a read signal supplied from an optical pickup 1 at a timing of a clock signal with a predetermined slice level, and supplies a data correcting circuit 60 with a binary signal corresponding to "1" when the level of a read signal is equal to or more than the predetermined slice level, while with a binary signal corresponding to "0" when it is less than the predetermined slice level. The data correcting circuit 60 comprises a series circuit formed of a flip-flop F10, an exclusive OR gate EX3, a flip-flop F11, an exclusive OR gate EX4, a flip-flop F12, an exclusive OR gate EX5, a flip-flop F13, an exclusive OR gate EX6, and a flip-flop F14. The data correcting circuit 60 fetches the binary signal supplied from the comparator 41 from the flip-flop F10, sequentially shifts it at timings of clock signal pulses supplied thereto, and outputs it from the flip-flop F14 as a corrected data output. In this event, the exclusive OR gate EX3, if supplied with an inverted signal from a data output D0 of the data correcting ROM 70, provides the flip-flop F11 with a signal having the logic level inverted from that of a signal supplied from the flip-flop F10. Also, the exclusive OR gate EX4, if supplied with an inverted signal from a data output D1 of the data correcting ROM 70, provides the flip-flop F12 with a signal having the logic level inverted from that of a signal supplied from the flip-flop F11. Further, the exclusive OR gate EX5, if supplied with an inverted signal from a data output D2 of the data correcting ROM 70, provides the flip-flop F13 with a signal having the logic level inverted from that of a signal supplied from the flip-flop F12.

Figure 8:
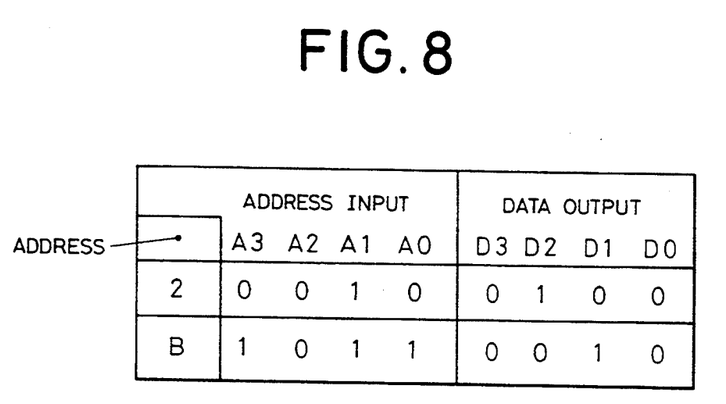
FIG. 8 shows a ROM map table for the digital signal reproducing apparatus according to the third feature of the present invention.

Also, the exclusive OR gate EX6, if supplied with an inverted signal from a data output D3 of the data correcting ROM 70, provides the flip-flop F14 with a signal having the logic level inverted from that of a signal supplied from the flip-flop F13. Data correction is carried out by the inverting actions of the exclusive OR gates EX3–EX6 as mentioned above. The outputs of the flip-flops F10–F13 are further supplied to address inputs A0–A3 of the data correcting ROM 70, respectively. In the data correcting ROM 70, inverted signal patterns have previously stored for correcting erroneous data pattern expected to occur. For example, if an erroneous data pattern "1011" may be expected when an input "0110" is supplied, and if an erroneous data pattern "1011" may be expected when an input "1001" is supplied, the data correcting ROM 70 includes a memory map as shown in FIG. 8. In this event, data D0–D3 for other addresses are all zero.

Next, the operation will be explained in greater detail.

Assuming, for example, that a read signal portion corresponding to "0110" is supplied to the comparator 41, and the comparator 41 erroneously determines "0010" which is supplied to the data correcting circuit 60. The data correcting circuit 60 sequentially shifts the data sequence "0010" at timings of clock signal pulses supplied thereto. In this event, when the first data "0" is stored in the flip-flop F13, and the remaining data "0, 1, 0" are stored in the flip-flops F12, F11, F10, respectively, the data correcting ROM 70 is made enabled to output data from a corresponding address. Since the flip-flops F10, F11, F12, F13 are loaded with "0, 1, 0, 0", respectively, these are supplied to the address inputs A0–A3 of the data correcting ROM 70. As a result, referring to FIG. 8, data "0100" stored in the second location of the data correcting ROM 70 is supplied to the exclusive OR gates EX3–EX6. That is, the exclusive OR gate EX5 only is supplied with an inverted signal of logic "1", and accordingly supplies the flip-flop F13 with "1" which is inverted from logic "0" stored in the flip-flop F12. The foregoing operation results in outputting the corrected data "0110" from the flip-flop F14.

As described above, the digital signal reproducing apparatus according to the third feature of the present invention previously stores inverted signal patterns for correction corresponding to possible erroneous data patterns expected to occur, where each expected erroneous data pattern serves as the address for storing its correct data pattern, and an error correction is performed on a supplied erroneous binary data using an inverted signal pattern for correction outputted from this memory.

While the digital signal reproducing apparatus of FIG. 7 shows an example for processing every four bits of signal as a unit block, the number of shift stages and exclusive OR gates, formed by flip-flops in the shown data correcting circuit 60 may be arbitrarily set in accordance with the number of bits to be processed together as a unit block. Likewise, the capacity of the data correcting ROM 70 may be arbitrarily set in accordance with the number of bits to be processed in a block.

As described above, the digital signal reproducing apparatus according to the first feature of the present invention converts a read signal outputted from the pickup into a binary signal, synchronizes the binary signal to produce a synchronized binary signal. A synchronized short pulse binary signal portion, which has a shorter inverting interval than a predetermined time and thus violates the run length limit, is detected from the synchronized binary signal. Then, determination is made as to which of sampling timings existing before and after the short pulse binary signal portion, the short pulse binary signal portion before synchronization is closer to. The level of the synchronized binary signal synchronized at the closer sampling timing is inverted to derive a correct data.

The digital signal reproducing apparatus according to the second feature of the present invention converts a read signal outputted from the pickup into a binary signal, synchronizes the binary signal to produce a synchronized binary signal. A synchronized short pulse binary signal portion, which has a shorter inverting interval than a predetermined time and thus violates the run length limit, is detected from the synchronized binary signal. The levels of the read signal at sampling timing existing immediately before and immediately after this synchronized short pulse binary signal portion before synchronization are compared to select one of the sampling timings existing immediately before or immediately after this short pulse binary signal portion in accordance with the comparison result. The logic level of the synchronized binary signal at the selected sampling timing is inverted to derive a correct data.

The digital signal reproducing apparatus according to the third feature of the present invention previously stores error correcting data for erroneous data expected to occur in a memory, and corrects erroneous data of a supplied binary signal. It will be therefore understood that the digital signal reproducing apparatus according to the first–third features of the present invention detects a short pulse binary signal portion which would not exist in a modulated code having a limited run length as the RLL code, and corrects erroneous data by inverting the level of a signal before or after the short pulse binary signal portion, so that a digital signal can be highly accurately reproduced from a recording medium on which such signals are recorded at a high density.

What is claimed is:

1. A digital signal reproducing apparatus for reproducing a digital signal from a read signal from a recording medium on which run length limited digital signals are recorded, comprising:

digitizing means for converting said read signal into a binary signal based on a predetermined threshold value;

synchronizing means for synchronizing said binary signal at predetermined sampling timings to produce a synchronized binary signal;

detector means for detecting a synchronized short pulse binary signal portion having an inverting interval shorter than a predetermined time from said synchronized binary signal;

determining means for comparing a time difference from a sampling timing existing immediately before said synchronized short pulse binary portion to a front edge timing of said short pulse binary signal portion with a time difference from a rear edge timing of said short pulse binary signal portion to a sampling timing existing immediately after said short pulse binary signal portion in order to determine one of said sampling timings existing immediately before and immediately after said short pulse binary signal portion which is closed to said short pulse binary signal portion than the other; and correcting means for inverting the value of said synchronized binary signal which has been synchronized at one of said sampling timings conforming to the determination result of said determining means to correct erroneously read data.

2. A digital signal reproducing apparatus for reproducing a digital signal from a read signal from a recording medium on which run length limited digital signals are recorded, comprising:

digitizing means for converting said read signal into a binary signal based on a predetermined threshold value;

synchronizing means for synchronizing said binary signal at predetermined sampling timings to produce a synchronized binary signal;

detector means for detecting a synchronized short pulse binary signal portion having an inverting interval shorter than a predetermined time from said synchronized binary signal;

comparator means for comparing signal levels of said read signal at said predetermined sampling timings existing immediately before and immediately after said synchronized short pulse binary signal portion before synchronization; and correcting means for selecting one of the sampling timings existing immediately before and immediately after said short pulse binary signal portion in accordance with the comparison result of said comparator means and inverting the value of said synchronized binary signal at the selected sampling timing to correct erroneously read data.

3. A digital signal reproducing apparatus for reproducing a run length limited digital signal from a read signal from a recording medium on which said run length limited digital signal is recorded, comprising:

digitizing means for converting said read signal into a binary signal based on a predetermined threshold value;

a memory for receiving said binary signal as an address input and outputting a correcting data corresponding to said address, indicating a bit position to be corrected, when said binary signal fail to satisfy a condition of run length; and correcting means, having said binary signal and said correcting data as inputs, for correcting said binary signal in accordance with said correcting data.

4. A digital signal reproducing apparatus for reproducing a digital signal from an analog read signal corresponding to a recording medium on which said digital signal is recorded, said apparatus comprising:

digitizing means for converting said read signal into a binary signal based on a predetermined threshold value; and detector means for detecting a short portion of said binary signal having an inverting interval shorter than a predetermined time;

correcting means for inverting a portion of said signal contiguous with said short portion.

5. The apparatus of claim 4, said digitizing means comprising:

A/D converting means for converting said read signal into a digitized signal; and synchronizing means for synchronizing said digitized signal at a predetermined timing to produce said binary signal.

6. The apparatus of claim 4, said correcting means including:

determining means for comparing a time difference between a sampling timing immediately preceding a beginning of said short portion and a leading edge of a portion of said read signal corresponding to said short portion to a time difference between a trailing edge of a portion of said read signal corresponding to said short portion to a sampling timing immediately following an ending of said short portion; and selecting means for selecting a smaller one of said differences and providing an output signal indicative thereof;

wherein said correcting means inverts one of a portion of said signal immediately preceding said short portion and a portion of said signal immediately following said short portion, based on said selecting means output signal.

7. The apparatus of claim 6, wherein:

said correcting means inverts said portion of said signal immediately preceding said short portion when said selecting means output signal indicates said time difference between said sampling timing immediately preceding the beginning of said short portion and the leading edge of said portion of said read signal corresponding to said short portion is shorter than said time difference between the trailing edge of said portion of said read signal corresponding to said short portion to said sampling timing immediately following the ending of said short portion; and said correcting means inverts said portion of said signal immediately following said short portion when said selecting means output signal indicates said time difference between said sampling timing immediately preceding the beginning of said short portion and the leading edge of said portion of said read signal corresponding to said short portion is longer than said time difference between the trailing edge of said portion of said read signal corresponding to said short portion to said sampling timing immediately following the ending of said short portion.

8. The apparatus of claim 4, said correcting means comprising:

comparator means for comparing signal levels of said read signal at a predetermined sampling timing immediately preceding said short portion and at a predetermined sampling timing immediately following said short portion; and inverting means for inverting a portion of said binary signal corresponding to one of said signal levels based on said comparator output.

* * * * *